United States Patent
Matsuda et al.

Patent Number: 5,640,016
Date of Patent: Jun. 17, 1997

[54] RARE-EARTH OXYSULFIDE SCINTILLATORS AND X-RAY DETECTORS USING RARE-EARTH OXYSULFIDE SCINTILLATORS

[75] Inventors: Naotoshi Matsuda; Masaaki Tamatani; Miwa Okumura; Kazuto Yokota, all of Tokyo, Japan

[73] Assignee: Kabushiki Kaisha Toshiba, Kanagawa-ken, Japan

[21] Appl. No.: 594,387

[22] Filed: Jan. 31, 1996

Related U.S. Application Data

[63] Continuation of Ser. No. 373,854, Jan. 18, 1995, abandoned.

[30] Foreign Application Priority Data

Feb. 25, 1994 [JP] Japan .................... 6-028312

[51] Int. Cl.$^6$ .................................. G01T 1/20
[52] U.S. Cl. ............ 250/361 R; 250/362; 250/363.01; 250/363.02; 250/370.11; 250/483.1
[58] Field of Search ................ 250/361 R, 362, 250/363.01, 363.02, 370.11, 483.1

[56] References Cited

U.S. PATENT DOCUMENTS 4,752,424  6/1988  Matsuda et al. .
4,863,882  9/1989  Matsuda et al. .

OTHER PUBLICATIONS

"Electron Traps In Zinc–Sulphide Phosphors", Hoogenstraaten, W., Philips Res. Repts, vol. 13, pp. 538–551, Feb. 1958.

"Measurement of Trap Levels by a Transient Thermoluminescence Method", Nakazawa, E., Oyo Buturi, vol. 55, pp. 145–152, Oct. 14, 1985.

"A Scintillator $Gd_2O_2S$:Pr,Ce,F for X–Ray Computed Tomography", Yamada et al., J. Electrochem. Soc., vol. 136, No. 9, pp. 2713–2716, Sep. 1989.

"Ceramic Scintillators for Advanced, Medical X–Ray Detectors", Greskovich et al., American Ceramic Society Bulletin, vol. 71, No. 7, pp. 1120–1130, Jul. 1992.

U.S. Patent Application Serial No. 004,574.
U.S. Patent Application Serial No. 669,228.
U.S. Patent Application Serial No. 022,594.
U.S. Patent Application Serial No. 418,725.
U.S. Patent Application Serial No. 902,066.
U.S. Patent Application Serial No. 325,653.
U.S. Patent Application Serial No. 735,109.

*Primary Examiner*—David P. Porta
*Assistant Examiner*—Richard Hanig
*Attorney, Agent, or Firm*—Finnegan, Henderson, Farabow, Garrett & Dunner, L.L.P.

[57] ABSTRACT

A scintillator is disclosed that comprises a ceramic of a rare-earth oxysulfide activated with Pr, such as $Gd_2O_2S$:Pr, having: (1) a ratio of a peak value at about 270 K to that at about 140 K in a glow curve of about 0.01 or less, when the thermoluminescence intensity of the scintillator is measured at a rate of temperature increase of 15±5 K/min after 20 minutes irradiation with ultraviolet rays having a wavelength of 254 nm and a power of 1 W/m$^2$ at liquid nitrogen temperature, and (2) a ratio of a peak value at about 630 nm to that at about 512 nm of a thermoluminescence of about 410 K with about 2 nm resolution of about 1 or less.

18 Claims, 5 Drawing Sheets

RARE-EARTH OXYSULFIDE SCINTILLATORS AND X-RAY DETECTORS USING RARE-EARTH OXYSULFIDE SCINTILLATORS

This application is a continuation of application Ser. No. 08/373,854, filed Jan. 18, 1995, now abandoned.

BACKGROUND OF THE INVENTION

This invention relates to a rare-earth oxysulfide scintillator and an X-ray detector using the scintillator.

As explained in the article "Ceramic Scintillators for Advanced, Medical X-ray Detectors," American Ceramic Society Bulletin, pp. 1120–1130 (1992) (incorporated herein in its entirety by reference), X-ray computed tomography (CT) is an important and useful medical diagnostic technique capable of reconstructing cross-sectional images, e.g., of the body. An important component of X-ray CT is a scintillator.

In general, an X-ray detector measures the intensity of X-rays passing through, e.g., a patient. The detector contains scintillator elements having luminescent ions, which emit visible light proportional to the amount of X-rays absorbed in each scintillator element. Scintillators then direct the emitted light onto photodiodes for conversion of light energy into electrical energy (electrical signals). The electrical signals are generally read every 1 ms and are digitized for computer generation of cross-sectional absorption coefficients suitable for display on a cathode ray tube (CRT) screen.

Scintillators emit light with X-ray irradiation, which is combined with a photodiode to detect X-rays for X-ray CT. Short afterglow and high X-ray radiation resistance are important properties required for effective scintillators. Equally important, scintillators must be highly sensitive to X-ray irradiation.

The American Ceramic Society Bulletin article, supra, describes acceptable properties of scintillators for use in X-ray detectors. They include:

- a high X-ray absorption coefficient (stopping power) of $\geq 20 \text{ cm}^{-1}$;
- <2% change in luminescent intensity after a strong X-ray dose of 500 Roentgens;
- a short primary decay time of $\leq 1$ ms; and
- a luminescent afterglow, or fractional light output, of <0.1% at 100 ms after X-ray turn-off.

With respect to afterglow, the present inventors, however, have discovered that the luminescent afterglow should be less than 0.01% at 100 ms after X-ray turn-off.

Japanese Laid-open patent KOKAI 58-204088 shows a $Gd_2O_2S:Pr$ scintillator, which is a rare-earth oxysulfide ceramic. Also, U.S. Pat. Nos. 4,752,424 and 4,863,882 disclose a method for producing such a scintillator.

Japanese Laid-open patent KOKAI 56-151376 shows a method for reducing afterglow, which is to dope rare-earth oxysulfides, such as $Gd_2O_2S:Pr$, with Ce. Based on experiments by the present inventors, doping with Ce is effective in reducing afterglow only 1 to 10 ms after stopping X-ray irradiating. However, Ce doping is not effective in reducing afterglow 100 ms after stopping X-ray irradiating. In particular, to reduce the intensity of afterglow to less than 0.01%, the Ce content is required to be more than 20 ppm. However, such a large amount of Ce-addition causes the intensity of emission to decrease.

Further, the addition of Ce is not effective in improving radiation resistance, i.e., reducing radiation damage. Japanese Laid-open patent KOKAI 3-192187 shows a method for reducing afterglow by reducing the amount of Eu included in a scintillator. But, this method is not effective in reducing afterglow 100 ms after stopping X-ray irradiating.

Japanese Laid-open patents KOKAI 2-173088, 2-209987, 2-212586 and 3-243686 show methods for improving radiation resistance. However, the reduction of the scintillator light output after 500 roentgens irradiation can not be suppressed to less than 2% by each of these methods.

SUMMARY OF THE INVENTION

Accordingly, an object of the present invention is to provide a scintillator having a low afterglow, and to provide an X-ray detector using the scintillator and to provide an X-ray CT scanner using the X-ray detector.

Another object of the present invention is to provide a scintillator having improved radiation resistance, and to provide an X-ray detector using the scintillator and to provide an X-ray CT scanner using the X-ray detector.

Another object of the present invention is to provide a scintillator having a high sensitivity to X-ray excitation, and to provide an X-ray detector using the scintillator and to provide an X-ray CT scanner using the X-ray detector. The present invention provides a scintillator comprising a rare-earth oxysulfide activated with Pr, such as $Gd_2O_2S:Pr$, which satisfies the following relations:

(1) in a glow curve,
 the ratio of a peak value at 270±20 K to a peak value at 140±10 K in a glow curve is about 0.01 or less, when the thermoluminescence intensity of the scintillator is measured with a rate of temperature increase of 15±5 K/min after 20 minutes irradiation with ultraviolet rays having a wavelength of 254 nm and a power of 1 $W/m^2$ at liquid nitrogen temperature, i.e., about 77 K;

(2) in an emission spectrum,
 the ratio of a peak value at 630±3 nm to a peak value at 512±3 nm is about 1 or less, when the thermoluminescence intensity is measured at 410±20 K with about 2 nm resolution.

The present invention further provides an X-ray detector comprising the above-mentioned scintillator which transduces an X-ray to a light, and a photodiode optically connected to the scintillator which transduces the light emitted from the scintillator to an electric signal.

The present invention further provides an X-ray CT scanner comprising an X-ray tube, and the above-mentioned X-ray detector.

DETAILED DESCRIPTION OF THE PREFERRED EMBODIMENTS

Figure 1:
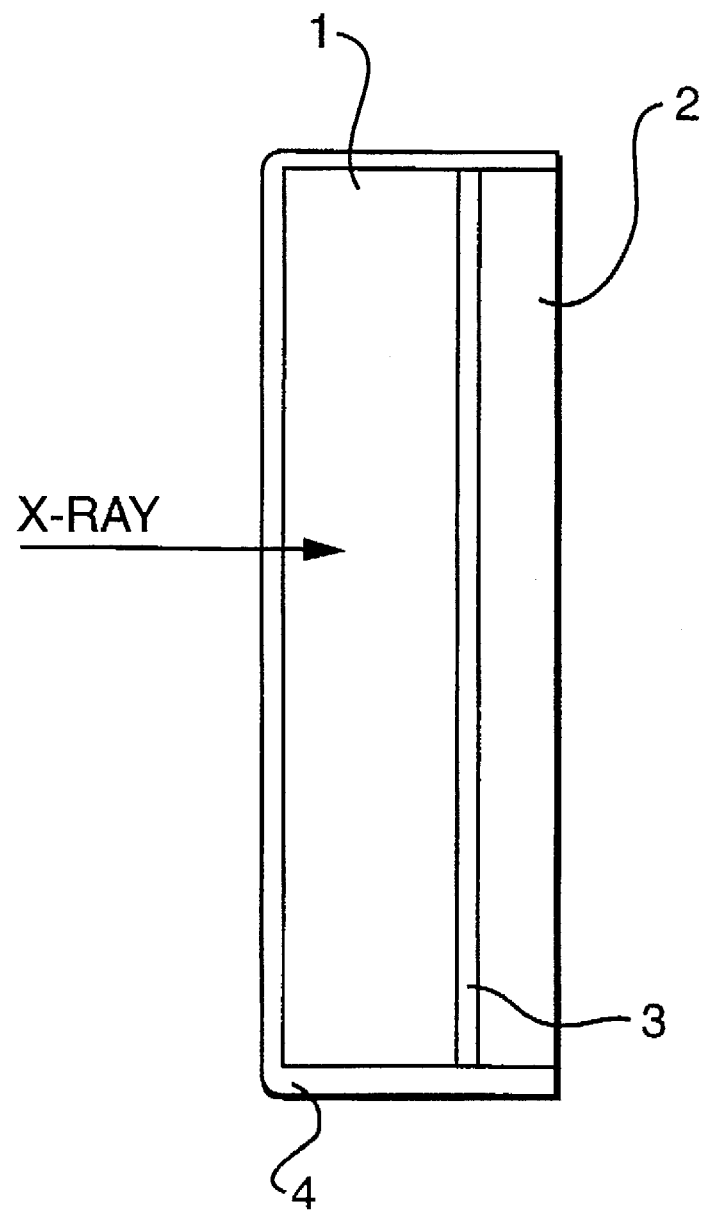
FIG. 1 shows a conceptual view of an X-ray detector of the present invention.

FIG. 1 shows a conceptual view of an X-ray detector. An X-ray detector is composed of a scintillator 1 and a photodiode 2. Scintillator 1 and photodiode 2 are optically connected. For example, scintillator 1 is attached with a transparent adhesive 3. Further scintillator 1 is covered with a reflecting layer 4. X-rays irradiated to scintillator 1 are transduced into light which can be detected by photodiode 2, and then photodiode 2 is irradiated by the light emitted from scintillator 1. As a result, information about an intensity of X-rays radiation can be obtained as electric information from a photodiode.

Figure 2:
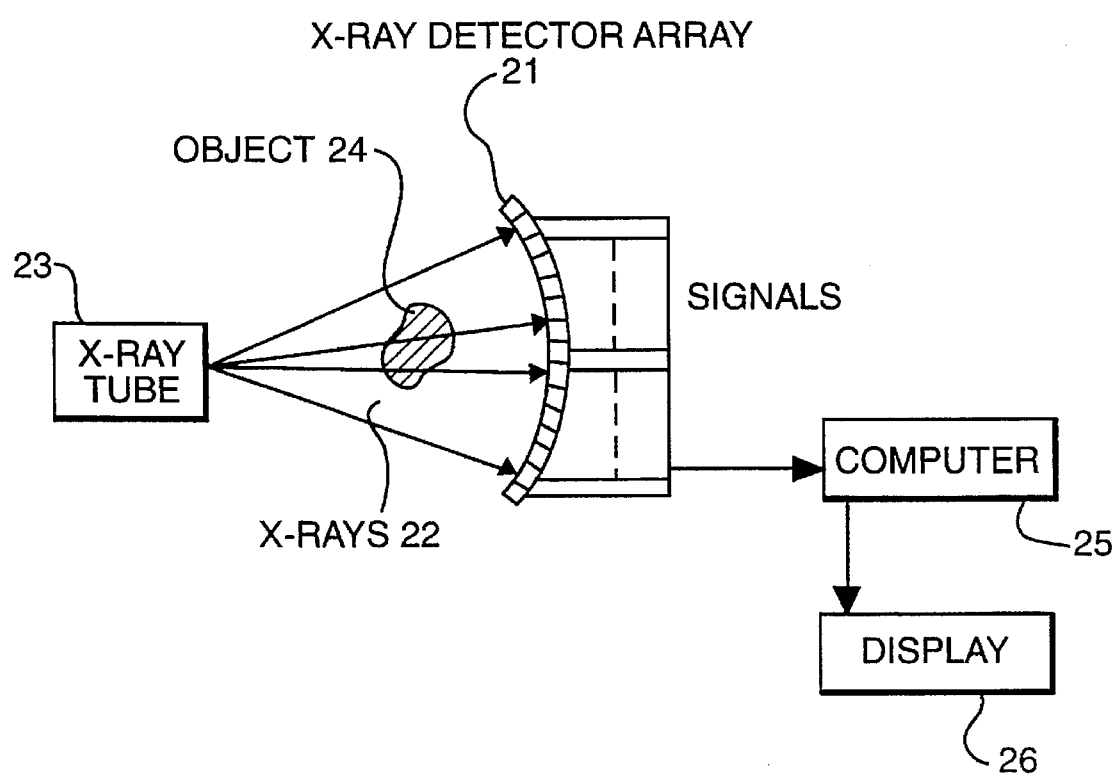
FIG. 2 shows a conceptual view of an X-ray CT scanner of the present invention.

FIG. 2 shows a conceptual view of an X-ray CT scanner. An X-ray detector array 21 having separated X-ray detectors are positioned so that X-ray detector array 21 can be irradiated by X-rays 22 emitted from an X-ray tube 23 and through an object 24. Generally, X-ray detector array 21 and X-ray tube 23 rotate around object 24 to obtain information from different angles. Signals obtained from X-ray detector array 21 are sent to a computer 25 to reconstruct an image on a display 26, such as a CRT.

X-ray detectors must have a high sensitivity to X-rays in order to reduce noise and obtain a good tomography picture.

Further, afterglow must be short so that X-ray CT scanners can operate at high speeds (short time intervals). Shorter time intervals between X-ray radiation permits an increase in the number of X-ray scans in a period of time.

Furthermore, the presence of "artifacts" can be a problem in an X-ray CT. If X-ray radiation resistance is not enough and some parts of X-ray detector array 21 are continuously irradiated by X-rays, signals obtained from these parts would be smaller than the other parts of the array. As a result, signals would be obtained as if there is something present, i.e., "artifact". Therefore, X-ray radiation resistance is equally important.

If X-ray radiation resistance is not enough, an adjustment of the X-ray detector is frequently required several times a day. However, in practice, such an adjustment should only occur once a day at most.

Accordingly, short afterglow and low X-ray radiation damage are important properties for a scintillator.

Afterglow also known as luminescent afterglow, is typically caused by existence of the trapping of electrons and/or holes at different host imperfections (vacancies, interstitials, etc.) and at substantial impurities which delay their arrival at the activator emitting sites, which corresponds to a peak in a glow curve. The peak may be changed by altering process conditions or the amount of some impurities.

The present inventors have discovered a relationship between a glow curve and afterglow of rare-earth oxysulfides activated with Pr. It was found that an intensity of afterglow 100 ms after stopping X-ray irradiating has a direct relationship with a peak value at about 270 K, such as about 270±20 K. In other words, a high intensity of afterglow will have a high peak value. Further, it was found that an intensity of afterglow about 100 ms after stopping X-ray irradiating does not substantially affect a peak value at about 140 K, such as about 140±10 K.

Therefore, the ratio of a peak value at about 270 K to a peak value at about 140 K can be used as a parameter to determine an intensity of afterglow. When the ratio is about 0.01 or less, an afterglow intensity 100 ms after stopping X-ray irradiating becomes very small, e.g., about 0.01% or less, so that the afterglow does not hamper the use of a scintillator in an X-ray detector for an X-ray CT scanner.

The ratio is changed by measuring conditions. In the present invention, the conditions of measuring thermoluminescence to obtain a glow curve are as follows:

(1) temperature of liquid nitrogen, i.e. about 77 K;

(2) previous irradiation of ultraviolet-rays having a wavelength of about 254 nm and a power of about 1 W/m$^2$ for about 20 minutes; and (3) rate of temperature increase of about 15 K/min, such as 15±5 K/min.

Further, it was found that the ratio of a peak value at about 630 nm, such as about 630±3 nm, to that at about 512 nm, such as about 512±3 nm, of a thermoluminescence spectrum of about 410 K corresponds to radiation resistance of rare-earth oxysulfides activated with Pr.

Emissions due to Pr ions in a rare-earth oxysulfide are primarily composed of an emission at about 512 nm corresponding to a transition from the $^3P_0$ level to the $^3H_4$ level. Further, an emission at about 670 nm corresponds to a transition from the $^3P_0$ level to the $^3F_2$ level. An emission spectrum excited by X-ray irradiation or ultraviolet-ray irradiation, or an emission spectrum of thermoluminescence at about 270 K is mainly composed of emissions from the $^3P_0$ level.

However, it was found that a peak at about 630 nm, corresponding to a transition from $^1D_2$ to $^3H_4$, becomes higher in an emission spectrum of thermoluminescence at about 410 K, such as about 410±20 K, and the peak value also relates to the degree of radiation resistance.

It is believed that radiation damage may be caused by Pr ions located in extraordinary sites, which contribute to the transition from the $^1D_2$ level. On the other hand, Pr ions in normal rare-earth ion sites contribute mainly to the transition from the $^3P_0$ level.

Therefore, the ratio of a peak value at about 630 nm to a peak value at about 512 nm can be used as a parameter to determine radiation resistance. When the ratio is about 1 or less, the reduction of the emission intensity after 500 roentgens irradiation is low enough, such as about 2% or less, so that the radiation deterioration is not a concern and can be ignored in an X-ray detector for an X-ray CT scanner, e.g., for a full day operation.

In the present invention, resolution of an emission spectrum is about 2 nm.

Therefore, a scintillator having a short afterglow and good radiation resistance can be obtained by using a rare-earth oxysulfide activated with Pr, such as $Gd_2O_2S$:Pr, wherein the ratio of a peak value at about 270 K to that at about 140 K in a glow curve is about 0.01 or less measured at a rate of temperature increase of 15±5 K/min after 20 minutes irradiation with ultraviolet ray having a wavelength of 254 nm and a power of 1 W/m$^2$ at liquid nitrogen temperature (77 K), and the ratio of a peak value at about 630 nm to that at about 512 nm in an emission spectrum of a thermoluminescence of about 410 K is about 1 or less.

In the present invention, rare-earth elements comprising rare-earth oxysulfides may include gadolinium (Gd), yttrium (Y), lanthanum (La), or lutetium (Lu). A concentration of Pr as an activator in rare-earth oxysulfides is preferably from about 0.01 to about 0.5 mol %.

EXAMPLE 1

Gadolinium oxysulfide fluorescent material activated with 1000 ppm praseodymium ($Gd_2O_2S$:Pr) was used as a raw material. The raw material also contained about 30 ppm phosphate ions ($PO_4^{3-}$), about 6 ppm sodium (Na) and about 4 ppm silicon (Si) as impurities.

A ceramic columnar block of $Gd_2O_2S$:Pr having a diameter of about 60 mm and a height of about 60 mm was produced by a Hot Isostatic Press (HIP) method with a tantalum capsule at a temperature of about 1500° C. and a pressure of about 1500 kgf/cm² (=147 MPa). The HIP method with a Ta capsule is disclosed in U.S. Pat. Nos. 4,752,424 and 4,863,882 in detail, and are incorporated in its entirety herein by reference. A plate-shaped sample having a width of about 30 mm, a thickness of about 2 mm, and a length of about 35 mm was cut from the block.

The plate-shaped sample was then subjected to a heat treatment at about 1350° C. for about 24 hours in a nitrogen atmosphere having an oxygen partial pressure below $10^{-5}$ Torr. This was accomplished by raising the temperature by a rate of 100 ° C./h until about 1350° C. was reached. After maintaining the heat treatment of the sample at a temperature of 1350° C. for 24 hours, the sample was then cooled at a rate of about $-100°$ C./h until a temperature of about 1100° C. was reached. After that, the sample was cooled in a furnace.

In general and for purposes of the present invention, heat treatment is performed at a temperature sufficient to obtain the properties of the scintillator of the present invention, and is preferably performed at a temperature from about 1200° C. to about 1500° C., more preferably from about 1300° C. to about 1400° C. The period of time for the heat treatment should be sufficiently long so as to obtain the desired properties, e.g., about 6 hours or more, preferably about 10 hours or more.

The rate at which the temperature is increased for heat treatment, once about 1100° C. is reached, is preferably about 300 ° C./h or less, more preferably about 200° C./h or less. The rate at which the temperature is decreased, until about 1100° C. is reached, is also preferably about 300° C./h or less in a steady state. For example, in a furnace cooling, i.e., cooling in a furnace without supplying power for heat, an initial cooling rate might be large. Therefore, it preferably should take about 10 minutes or more for the maximum temperature, e.g., about 1350° C., to decrease about 100° C.

The heat treatment was performed in a sagger of $Gd_2O_2S:Pr$, i.e., a box composed of rare-earth oxysulfides, preferably the substantially same material of the plate-shaped sample, so as to protect the plate-shaped sample from pollution during the heat treatment. For example, carbon generated from components of a furnace would affect the X-ray sensitivity or radiation resistance.

After that, a scintillator having a width of about 1 mm, a thickness of about 2 mm, and a length of about 30 mm was cut from the heat-treated plate-shaped sample.

The ratio of a peak value at about 270 K to that at about 140 K in a glow curve was measured. The glow curve was obtained by detecting the thermoluminescence intensity of the scintillator sample at a rate of temperature increase of about 17 K/min after 20 minutes irradiation with ultraviolet rays having a wavelength of about 254 nm and a power of 1 W/m² at liquid nitrogen temperature (77 K). The ratio was about 0.008.

Figure 3:
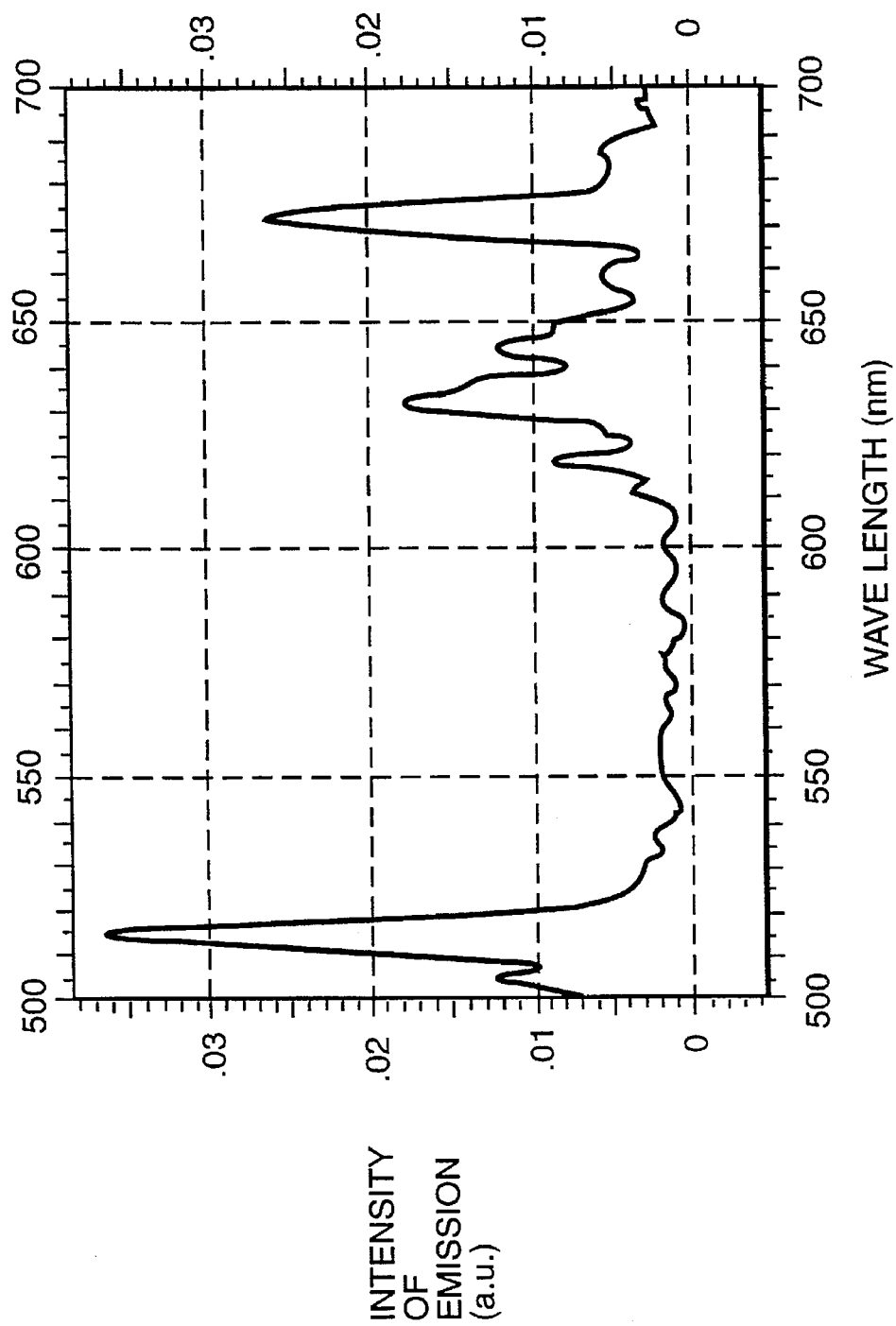
FIG. 3 shows an emission spectrum of a thermoluminescence of Example 1 of the present invention.

An emission spectrum of thermoluminescence between about 400 K and about 420 K was measured with a multichannel type spectrometer having resolution of about 2 nm as shown in FIG. 3. The ratio of a peak value at about 630 nm to that at about 512 nm was about 0.5.

The scintillator was attached to a silicon photodiode to form an X-ray detector. The sensitivity of the X-ray detector was about two times higher than an X-ray detector using a single crystal of $CdWO_4$ as a scintillator.

The X-ray detector was irradiated by X-rays for about 0.5 second with a tube voltage of 120 kVp and a tube current of 200 mA. Afterglow intensity 100 ms after termination of excitation by X-rays irradiation was about 0.008%., which is sufficiently small and permissible in practice.

Further, sensitivity reduction after 500 roentgens irradiation of X-rays at a tube current of about 120 kVp was only about 1%, which is sufficiently small and permissible in practice.

Heat treatment by means of the present invention as well as reducing the amount of impurities in the scintillator was effective in obtaining excellent properties.

EXAMPLE 2

Gadolinium oxysulfide fluorescent material activated with about 1000 ppm praseodymium ($Gd_2O_2S:Pr$) was used as a raw material. The raw material contained about 40 ppm phosphate ions ($PO_4^{3-}$), about 4 ppm sodium (Na) and about 3 ppm silicon (Si) as impurities, and further contained about 0.3 ppm of cerium (Ce) as an additive.

In general, Ce addition can reduce the amount of afterglow. However, excess addition of Ce may cause a reduction of sensitivity for X-ray radiation. Therefore, for purposes of the present invention, the amount of Ce is preferably about 1 ppm or less, more preferably from about 0.01 ppm to about 0.9 ppm.

The scintillator of Example 2 having the same size of Example 1 was produced by the same method of Example 1.

Figure 4:
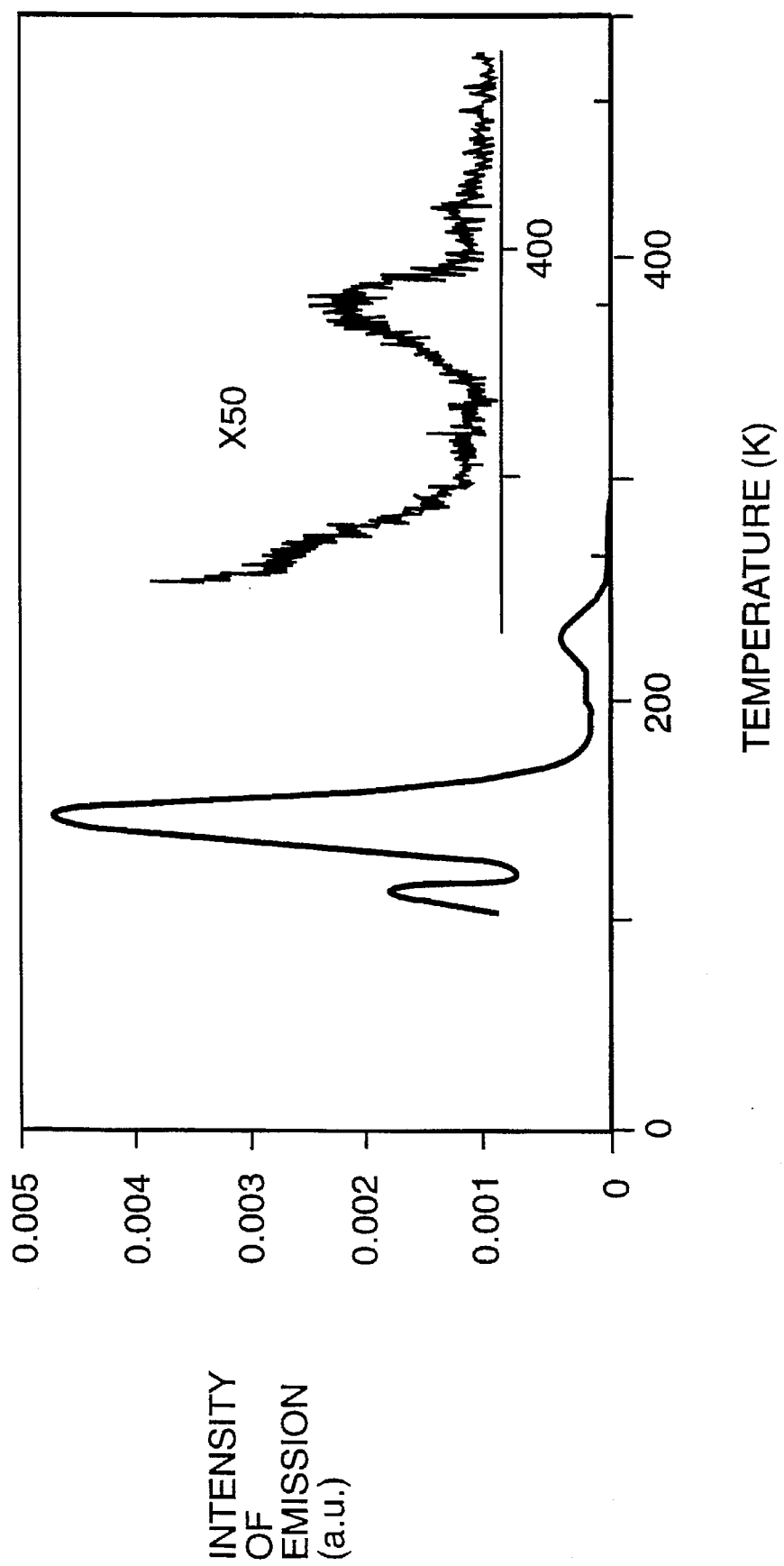
FIG. 4 shows a glow curve of Example 2 of the present invention.

The ratio of a peak value at about 270 K to that at about 140 K in a glow curve was measured. The glow curve shown in FIG. 4 was obtained by detecting the thermoluminescence intensity of the scintillator under the same conditions of Example 1. The part of FIG. 4 with "×50" shows the emission intensity enlarged by 50 times between about 270 and 480 K. The ratio was about 0.006.

The ratio of a peak value at about 630 nm to that at about 512 nm was measured as in Example 1 and was about 0.3.

The sensitivity of an X-ray detector using this scintillator was about 1.9 times higher than an X-ray detector using a single crystal of $CdWO_4$ as a scintillator.

The afterglow intensity under the same conditions of Example 1 was about 0.005%., which is sufficiently small and permissible in practice. Further, sensitivity reduction after 500 roentgens irradiation of X-rays under the same conditions of Example 1 was only about 0.8%, which is sufficiently small and permissible in practice.

EXAMPLE 3

Gadolinium oxysulfide fluorescent material activated with about 1000 ppm praseodymium ($Gd_2O_2S:Pr$) was used as a raw material. The raw material contained about 30 ppm phosphate ions ($PO_4^{3-}$), about 12 ppm sodium (Na) and about 3 ppm silicon (Si) as impurities, and further contained about 0.8 ppm of cerium (Ce) as an additive.

The scintillator of Example 3 having the same size of Example 1 was produced by the same method of Example 1 except the heat treatment temperature was about 1400° C., the temperature increase rate was about 200° C./h, and the sample was cooled in a furnace.

The ratio of a peak value at about 270 K to that at about 140 K in a glow curve was about 0.002, which was measured as in Example 1. The ratio of a peak value at about 630 nm to that at about 512 nm was also measured as in Example 1 and was about 0.8.

The sensitivity of an X-ray detector using this scintillator was about 1.7 times higher than an X-ray detector using a single crystal of $CdWO_4$ as a scintillator.

The afterglow intensity under the same conditions of Example 1 was about 0.003%., which is sufficiently small and permissible in practice. Further, sensitivity reduction after 500 roentgens irradiation of X-rays under the same conditions of Example 1 was only about 1.8%, which is also sufficiently small and permissible in practice.

COMPARATIVE EXAMPLE 1

The same raw material of Example 1 was used. A scintillator having the same size of Example 1 was produced by the same method of Example 1 without any heat treatment.

Figure 5:
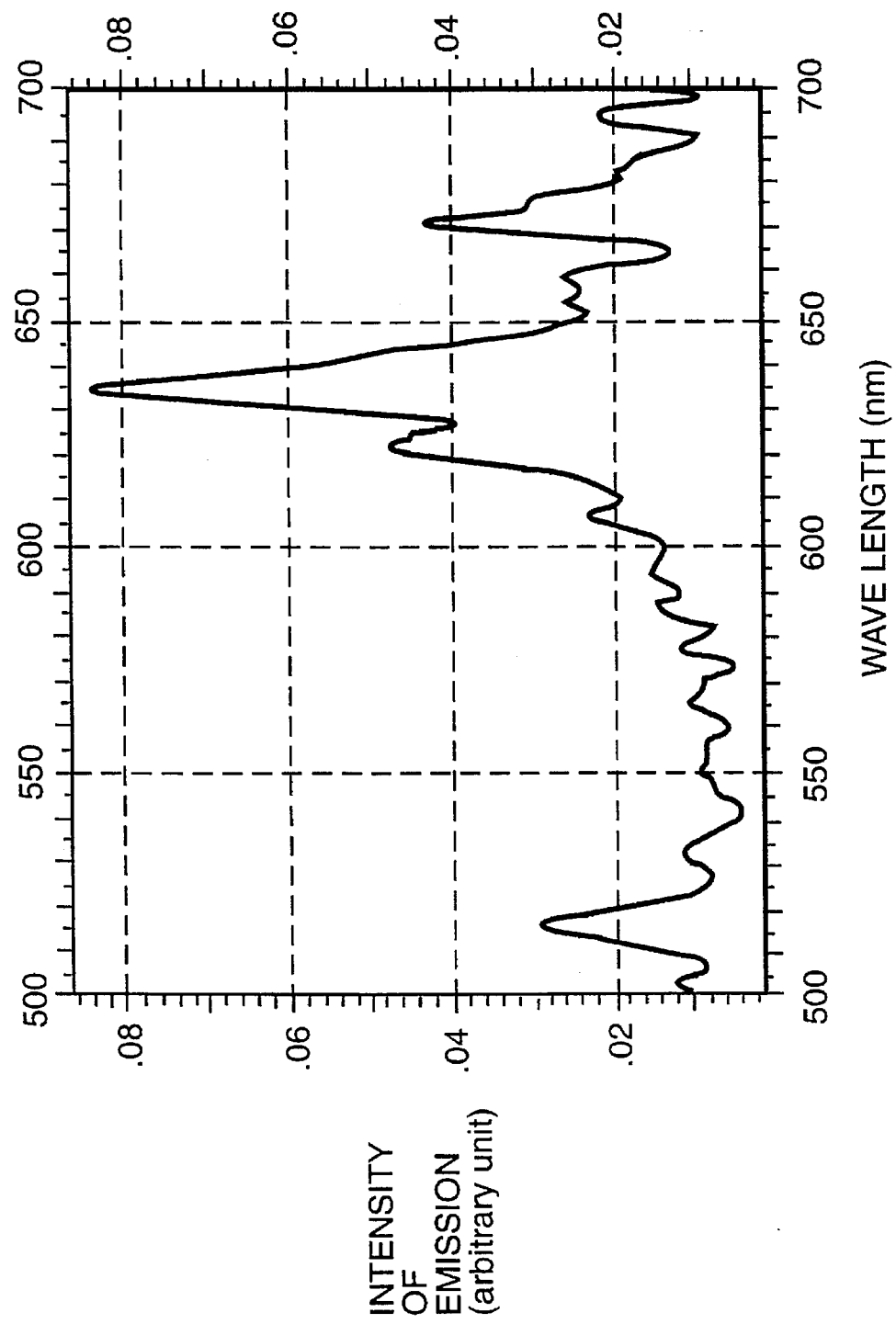
FIG. 5 shows an emission spectrum of a thermoluminescence of Comparative example 1.

The ratio of a peak value at about 270 K to that at about 140 K in a glow curve was about 0.3, which was measured in the same manner as Example 1. An emission spectrum, obtained as in Example 1, is shown in FIG. 5. The ratio of a peak value at about 630 nm to that at about 512 nm was also measured as in Example 1, and was about 3.

The sensitivity of an X-ray detector using this scintillator was about 1.7 times higher than an X-ray detector using a single crystal of $CdWO_4$ as a scintillator.

However, afterglow intensity under the same conditions of Example 1 was about 0.2%, which is too large in practice. Thus, for example, an X-ray CT scanner could not be operated at a high speed. Sensitivity reduction after 500 roentgens irradiation of X-rays under the same conditions of Example 1 was about 2.8%, which is too large and not permissible in practice. Thus, for example, some adjustments would be needed more than once a day during operation of the X-ray CT scanner using this scintillator.

COMPARATIVE EXAMPLE 2

The same raw material of Example 1 was used except about 30 ppm of Ce was also used. A scintillator having the same size of Example 1 was produced by the same method of Example 1 without any heat treatment.

The ratio of a peak value at about 270 K to that at about 140 K in a glow curve was about 0.007, which was measured in the same manner as Example 1. The ratio of a peak value at about 630 nm to that at about 512 nm was also measured in the same manner as Example 1, and was about 2.

The sensitivity of the X-ray detector using this scintillator was about 1.4 times higher than an X-ray detector using a single crystal of $CdWO_4$ as a scintillator.

Afterglow intensity under the same conditions of Example 1 was about 0.008%., which is sufficiently small in practice. However, sensitivity reduction after 500 roentgens irradiation of X-rays tested in the same manner as Example 1 was about 2.5%, which is too large and not permissible in practice.

What is claimed is:

1. A scintillator comprising a rare-earth oxysulfide activated with Pr having:
   (1) a ratio of a peak value at about 270 K to that at about 140 K in a glow curve of about 0.01 or less, when the thermoluminescence intensity of the scintillator is measured at a temperature increasing ratio of about 15 K/min after about 20 minutes irradiation with ultraviolet rays having a wavelength of about 254 nm and a power of about 1 W/m² at about liquid nitrogen temperature; and
   (2) a ratio of a peak value at about 630 nm to that at about 512 nm of a thermoluminescence of about 410 K with about 2 nm resolution of about 1 or less.

2. The scintillator according to claim 1, wherein the rare-earth oxysulfide further comprises Ce.

3. The scintillator according to claim 1, wherein the rare-earth oxysulfide is $Gd_2O_2S$.

4. The scintillator according to claim 1, wherein the scintillator is produced by hot isostatic pressing and a heat treatment.

5. The scintillator according to claim 4, wherein the heat treatment is performed from about 1200° C. to about 1500° C.

6. The scintillator according to claim 4, wherein the heat treatment is performed for at least about six hours.

7. The scintillator according to claim 5, wherein a temperature increase rate of the heat treatment above about 1100° C. is about 300° C./h or less.

8. The scintillator according to claim 5, wherein a temperature decrease rate of the heat treatment until about 1100° C. is about 300° C./h or less.

9. The scintillator according to claim 4, wherein it takes at least about 10 minutes for a maximum temperature of the heat treatment to decrease about 100° C.

10. An X-ray detector comprising:
    the scintillator of claim 1; and
    a photodiode optically connected to the scintillator which transduces the light emitted from the scintillator to an electric signal.

11. The X-ray detector according to claim 10, wherein the rare-earth oxysulfide further comprises Ce.

12. The X-ray detector according to claim 10, wherein the rare-earth oxysulfide is $Gd_2O_2S$.

13. An X-ray CT scanner, comprising:
    an X-ray tube; and
    an X-ray detector positioned so as to detect X-rays through an object and comprising the scintillator of claim 1, and a photodiode optically connected to the scintillator which transduces the light emitted from the scintillator to an electric signal.

14. A scintillator comprising a rare-earth oxysulfide activated with Pr having:
    (1) a ratio of a peak value at 270±20 K to that at 140±10 K in a glow curve of about 0.01 or less, when the thermoluminescence intensity of the scintillator is measured at a temperature increasing rate of 15±5 K/min after about 20 minutes irradiation with ultraviolet rays having a wavelength of about 254 nm and a power of about 1 W/m² at liquid nitrogen temperature; and
    (2) a ratio of a peak value at 630±3 nm to that at 512±3 nm of a thermoluminescence of 410±20 K with about 2 nm resolution of about 1 or less.

15. An X-ray detector comprising:
    the scintillator of claim 14; and
    a photodiode optically connected to the scintillator which transduces the light emitted from the scintillator to an electric signal.

16. The X-ray detector according to claim 15, wherein the rare-earth oxysulfide further comprises Ce.

17. The X-ray detector according to claim 15, wherein the rare-earth oxysulfide is $Gd_2O_2S$.

18. An X-ray CT scanner, comprising:
    an X-ray tube; and
    an X-ray detector positioned so as to detect X-rays through an object and comprising the scintillator of claim 14, and a photodiode optically connected to the scintillator which transduces the light emitted from the scintillator to an electric signal.

* * * * *